United States Patent
Adam et al.

(10) Patent No.: US 9,098,552 B2
(45) Date of Patent: Aug. 4, 2015

(54) SCORING IMAGES RELATED TO ENTITIES

(71) Applicant: Google Inc., Mountain View, CA (US)

(72) Inventors: Hartwig Adam, Marina del Rey, CA (US); Sylvain Gelly, Olten (CH); Yuan Li, Los Angeles, CA (US); Taehee Lee, Los Angeles, CA (US)

(73) Assignee: Google Inc., Mountain View, CA (US)

( * ) Notice: Subject to any disclaimer, the term of this patent is extended or adjusted under 35 U.S.C. 154(b) by 214 days.

(21) Appl. No.: 13/759,631

(22) Filed: Feb. 5, 2013

(65) Prior Publication Data

US 2015/0169575 A1  Jun. 18, 2015

(51) Int. Cl.
G06F 17/30 (2006.01)

(52) U.S. Cl.
CPC ...... *G06F 17/3053* (2013.01); *G06F 17/30244* (2013.01); *G06F 17/30262* (2013.01); *G06F 17/30265* (2013.01)

(58) Field of Classification Search
CPC .......... G06F 17/3053; G06F 17/30262; G06F 17/30244; G06F 17/30265
See application file for complete search history.

(56) References Cited

U.S. PATENT DOCUMENTS

| | | | |
|---|---|---|---|
| 8,254,647 B1 * | 8/2012 | Nechyba et al. | 382/118 |
| 8,307,005 B1 * | 11/2012 | He et al. | 707/791 |
| 8,370,282 B1 * | 2/2013 | Leung et al. | 706/20 |
| 8,429,173 B1 * | 4/2013 | Rosenberg et al. | 707/748 |
| 2008/0019661 A1 * | 1/2008 | Obrador et al. | 386/52 |
| 2008/0089561 A1 * | 4/2008 | Zhang | 382/118 |
| 2010/0008547 A1 * | 1/2010 | Yagnik et al. | 382/118 |
| 2011/0116690 A1 | 5/2011 | Ross et al. | |
| 2014/0140625 A1 * | 5/2014 | Zhang et al. | 382/195 |
| 2014/0177966 A1 * | 6/2014 | Kaheel et al. | 382/195 |

FOREIGN PATENT DOCUMENTS

WO  WO 2011060565 A1 *  5/2011

OTHER PUBLICATIONS

Wiskott, Laurenz, et al. "Face recognition by elastic bunch graph matching." Intelligent Biometric Techniques in Fingerprint and Face Recognition, eds. L.C. Jain et al., publ. CRC Press, ISBN 0-8493-2055-0, Chapter 11, pp. 355-396, (1999).*

* cited by examiner

*Primary Examiner* — William Spieler
(74) *Attorney, Agent, or Firm* — Fish & Richardson P.C.

(57) ABSTRACT

Methods, systems, and apparatus for scoring images related to entities. In one aspect, a method includes identifying images associated with a person, each image being included in one or more resources; obtaining, for each resource that includes one of the images, a quality score that represents a quality of the resource; for each of the images: generating an image resource quality score from the quality scores of the resources that include the image; identifying a set of similar images from the images, each similar image having a measure of similarity to the image that meets a similarity measure threshold; generating an image score based on image resource quality scores of the resources that include the similar images relative to image resource quality scores of the resources that include each of the images; and generating an image authority score based on the image resource quality score and the image score.

19 Claims, 4 Drawing Sheets

SCORING IMAGES RELATED TO ENTITIES

BACKGROUND

This specification relates to scoring images that are related to entities.

The Internet provides access to a wide variety of resources, for example, webpages, images, audio files, and videos. A variety of search engines are available for identifying particular resources accessible over the Internet. For example, digital images that satisfy a user's informational need can be identified by an image search process in which keywords or other data are processed to identify collections of digital images. Each image is identified to the user by an image search result. The image search result also references a landing page, which is a web page resource that includes the image resource represented in the image search result.

Search results generated by a search engine are generally ranked and presented to a user in an ordered list of search results. The rankings may be based on how the search engine determines the relevance of resources specified by the search results to a particular query issued by the user.

A very common entity that people search for is a person. Thus, users use search engines to identify images associated with a particular person. The images associated with the particular person may vary in size, shape, and content.

SUMMARY

In general, one innovative aspect of the subject matter described in this specification can be embodied in methods that include the actions of identifying a plurality of images associated with a particular person, each image being included in one or more resources; obtaining, for each of a plurality of resources that each include one of the plurality of images, a quality score for the resource, the quality score representing a quality of the resource with respect to the quality of other resources; for each of the plurality of images: generating an image resource quality score from one or more of the quality scores of one or more of the resources that include the image; identifying a set of similar images from the plurality of images, each similar image having a measure of similarity to the image that meets a similarity measure threshold; generating an image score based on image resource quality scores of one or more of the resources that include the similar images relative to image resource quality scores of the resources that include each of the plurality of images; and generating an image authority score based on the image resource quality score and the image score. Other embodiments of this aspect include corresponding systems, apparatus, and computer programs, configured to perform the actions of the methods, encoded on computer storage devices.

These and other embodiments can each optionally include one or more of the following features. The method may further comprise ranking each of the plurality of images according to the image authority scores; selecting a highest ranking image from the ranked images; and providing a user device with data that causes the highest ranking image to be displayed.

The quality score for each resource may be determined independent of the content of the resource. The image resource quality score for each image may be an average of the quality scores of each resource that includes the image. The image resource quality score for each image may be a highest quality score of the quality scores of each resource that includes the image. The set of similar images may be a proper subset of the plurality of images.

Each of the plurality of images may include a face detected by one or more facial recognition processes. Each measure of similarity to the image may be based on a comparison of a portion of the image that includes a face to a portion of the similar image that includes a face, and wherein the portion of the image is less than the whole image and the portion of the similar image is less than the whole similar image. The image score for the image may be further based on a facial recognition confidence score, the facial recognition confidence score indicating a confidence that the image includes one or more facial features. The image score for the image may be further based on a portrait score, the portrait score indicating a degree to which a bounding box that defines an area including the face included in the image matches selected bounding box feature values.

Particular embodiments of the subject matter described in this specification can be implemented so as to realize one or more of the following advantages. Authoritative images, or high quality images, can be identified based on their inclusion in multiple resources that are of high quality and based on the identification of similar images that are also included in other resources of high quality. In particular, comparing image resource quality scores for similar images to image resource quality scores of dissimilar images provides a relative measure of image quality that can be used to select images that have a high degree of authority with respect to an entity relative to the authority of other images with respect to the same entity. Images with a relatively high authority with respect to an entity may be more likely to satisfy a user's informational need than images that have a relatively low authority with respect to the entity. In addition, images with high image scores for an entity are likely to be visually representative, clear and distinguishable from other images related to that entity.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

The systems and methods disclosed herein identify, for a particular entity that is a subject of a search, an authoritative image of the entity.

Images that are associated with a particular entity, such as a person, and that are included in resources are identified. For example, a search engine may, in response to receiving a query related to the particular person, identify images associated with the particular person and corresponding web pages that include those images. For each resource that includes one of the images, a quality score is obtained that represents the quality of the resource with respect to the quality of other resources.

For each image identified as being associated with the particular person, an image resource quality score is generated from the quality scores of each resource that includes the image. Similar images are identified, and an image score for the image is generated based on the quality scores of the resources that include the similar images relative to the quality scores of the resources that include the images identified as associated with the particular person. Based on the image resource quality score and the image score, an image authority score is generated for the image. Image authority scores are used to rank images with respect to a person.

Example Environment

Figure 1:
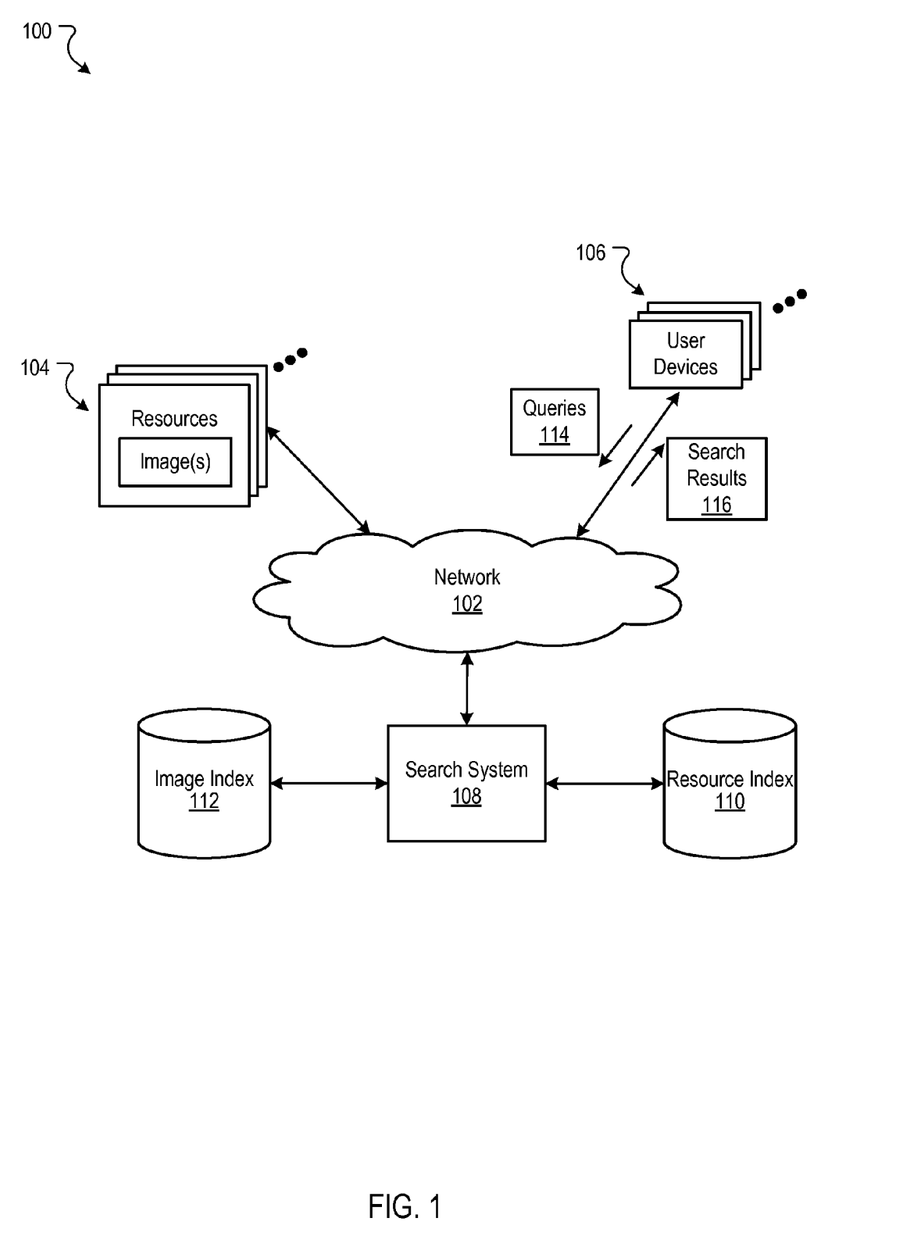
FIG. 1 is a block diagram of an example environment in which images related to entities are scored.

FIG. 1 is a block diagram of an example environment 100 in which images related to entities are scored. A computer network 102, such as a local area network (LAN), wide area network (WAN), the Internet, or a combination thereof, connects publisher resources 104, user devices 106, and the search system 108. The online environment 100 may include many thousands of publisher resources 104 and user devices 106.

A resource 104 is any data that can be provided by a publisher over the network 102 and that is associated with a resource address. Resources include HTML pages, word processing documents, and portable document format (PDF) documents, images, video, and feed sources, to name just a few. The resources can include content, such as words, phrases, pictures, and so on, and may include embedded information (such as meta information and hyperlinks) and/or embedded instructions (such as scripts). Each resource 104 is maintained by a publisher, which is an entity that controls, manages and/or owns the resource 104.

A user device 106 is an electronic device that is under the control of a user and is capable of requesting and receiving resources 104 over the network 102. Example user devices 106 include personal computers, mobile communication devices, and other devices that can send and receive data over the network 102. A user device 106 typically includes a user application, such as a web browser, to facilitate the sending and receiving of data over the network 102. The web browser can enable a user to display and interact with text, images, videos, music and other information typically located on a web page at a website on the world wide web or a local area network.

To facilitate searching of these resources 104, the search system 108 identifies the resources by crawling the publisher resources 104 and indexing the resources provided by the publishers. The indexed and, optionally, cached copies of the resources, are stored in a resource index 110. The search system 108 also indexes and, optionally, caches images in an image index 112.

The user devices 106 submit search queries 114 to the search system 108. The search queries 114 are submitted in the form of a search request that includes the search query. In response to the search request, the search system 108 uses the resource index 110 and/or the image index 112 to identify resources and/or images that are relevant to the queries. The search system 108 identifies the resources in the form of search results 116 and returns the search results to the user devices 106 in search results page resource. A search result is data generated by the search system 108 that identifies a resource and/or image that satisfies a particular search query, and includes a resource locator for the resource. An example search result can include a web page title, a snippet of text and/or an image extracted from the web page, and the URL of the web page.

The search results 116 are ranked based on scores related to the resources and images identified by the search results, such as information retrieval ("IR") scores, resource quality scores, image resource quality scores, image scores, image authority scores, and/or a separate ranking of each resource or image relative to other resources or images (e.g., an authority score). The search results are ordered according to these scores, which are discussed in further detail below, and provided to the user device according to the order.

The user devices 106 receive the search results pages and render the pages for presentation to users. In response to the user selecting a search result at a user device 106, the user device 106 requests the resource or image identified by a resource locator included in the selected search result. The publisher of the resource receives the request for the resource/image from the user device 106 and provides the resource/image to the requesting user device 106.

In some implementations, metrics, scores, and other information related to the selection and/or provision of resources and images included search results are stored in the indexes. For example, the resource index 110 may include data indicating authority scores, quality scores, and click-through rates of resources. The image index 112 may include, for example, data indicating image quality scores, image authority scores, image resource quality scores, facial recognition confidence scores, portrait scores, image click-through rates, and resources that include the images.

In some implementations, the queries 114 submitted from user devices 106 may be stored in query logs. Click data for the queries and the resources referenced by the search results may be stored in click logs. The query logs and the click logs define search history data that include data from and related to previous search requests. The click logs define actions taken responsive to search results provided by the search system 108. The query logs and click logs can be used to map queries submitted by the user devices to resources that were identified in search results and the actions taken by users. The click logs and query logs can thus be used by the search system 108 to determine information related to the queries submitted by the user devices, such as the actions taken in response to the queries or how often the queries are submitted. This information, in turn, may be used by the search system 108 to determine one or more of the aforementioned metrics and scores used to rank resources and/or images.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Scoring Images for Entities

Figure 2:
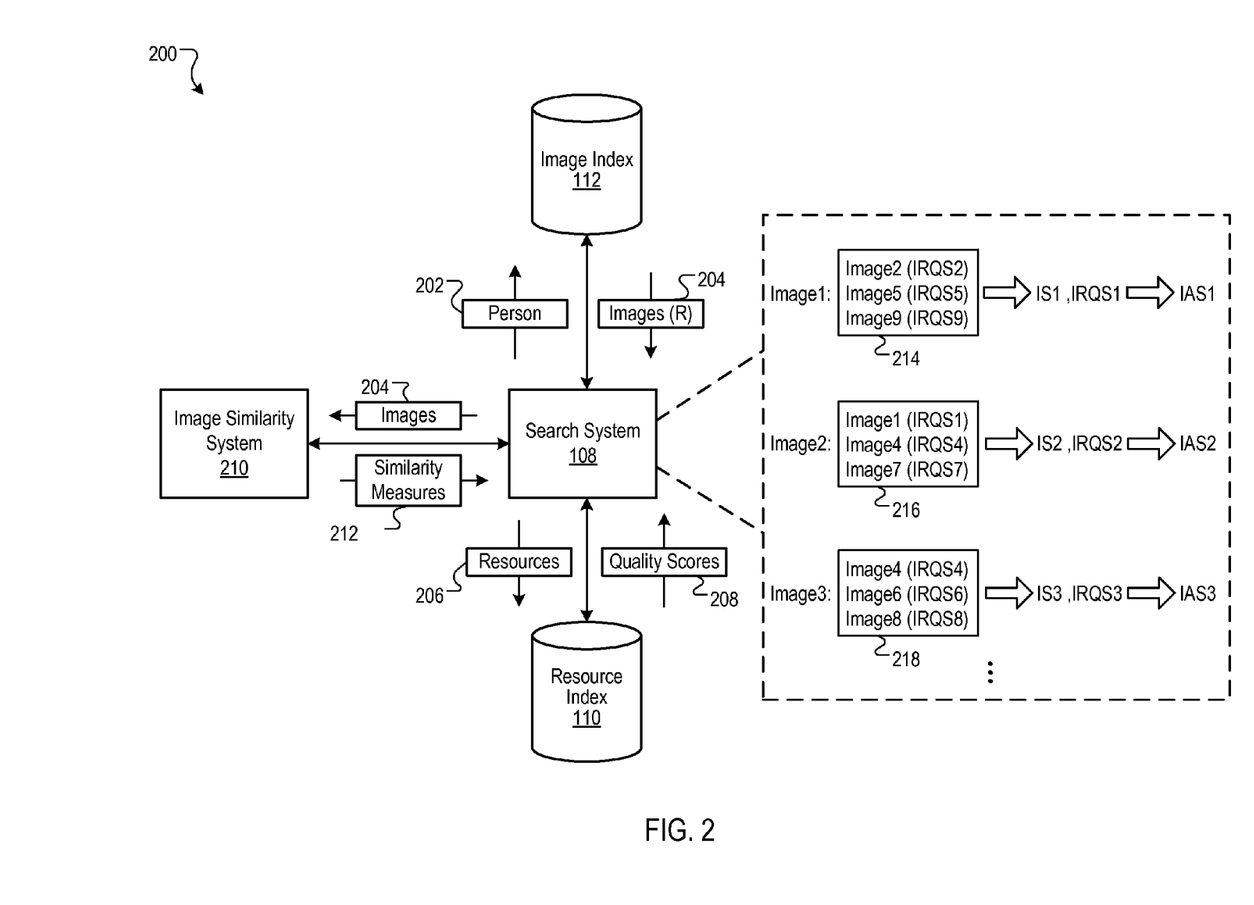
FIG. 2 is a block diagram of an example data flow in which images related to entities are scored.

FIG. 2 is a block diagram of an example data flow 200 in which images related to entities are scored. In particular, the data flow 200 depicts the generation of image authority scores for images of people. The image authority scores are then used in search operations. For example, the image authority scores may be used to select a "headshot" image of a particular person.

The image authority score (IAS) for an image, in some implementations, is based on a combination of an image resources quality score (IRQS) and an image score (IS), e.g.:

$$IAS = f(IRQS, IS)$$

The image resource quality score for an image is based on quality scores of resources that include the image. The image score for a particular image is, in some implementations, based on one or more of the following: the image resource quality scores of similar "neighbor" images (NS), a facial recognition confidence score (FRCS), and a portrait score (PS), e.g., $$IS = f(NS, FRCS, PS)$$

The derivation of each of these scores and example functions used to determine the image authority score and image scores are described in more detail in the sections that follow.

Image Identification and Resource Quality Scores

In operation, the search system 108 identifies images associated with a particular person. In some implementations, the search system 108 may obtain images 204 related to a particular person 202 from the image index 112. Data identifying the images 204 associated with the particular person also includes other information related to the images, such as the resources that include the images, labels associated with the image, and the like.

By way of example, the search system 108 may identify images in the image index that are associated with George Washington. The images may include, for example, famous paintings of George Washington, images of currency that depict George Washington, George Washington's presidential portrait, and other portraits of George Washington. Data identifying each of the images of George Washington may also indicate the web pages on which the images may be found. Some images may be found on many different web pages, and some images may only be found on a single web page.

In some implementations, each of the identified images 204 includes a face detected by a facial recognition process. Any suitable facial recognition process may be used. For example, a facial recognition process may produce a confidence score that indicates a confidence that the image includes a face. The confidence score may be based on, for example, detection of facial features—such as detection of ears, nose, eyes, and mouth—and the position of identified facial feature with respect to one another. Images having a facial recognition confidence score above a threshold may be identified as an image that includes a face. In some implementations, the confidence score also indicates a confidence in the visual clarity of an image, e.g., how sharp facial features are, and whether portions of an image or face are missing, covered, or altered. In some implementations, data stored in the image index 112 indicates which images include a face. In another implementation, the search system 108 performs the facial recognition process.

The search system 108 also obtains quality scores 208 for resources 206 that include the images 204. Quality scores 208 may be obtained from the resource index 110, and they may be obtained for each resource that includes one of the images 204. In some implementations, scores are obtained for only a subset of the resources that include the identified images, e.g., the number of quality scores obtained may be limited to 10 resources per image.

Each quality score for a resource represents a quality of the resource with respect to the quality of other resources. The quality of a resource may be measured by any suitable metric or combination of metrics. For example, quality of a resource may be measured by user ratings, click-through rates (e.g., number of selections of search results referencing the resource with respect to a particular query or multiple queries), and/or a number and type of links to the resource from other resources. In some implementations, the quality score for each resource is determined independent of the content of the resource. For example, the quality score for a web page may be based on the number and type of links to the web page from other web pages. Metrics and combinations of metrics for a resource may be compared to corresponding metrics associated with other resources in order to determine relative quality among a group of resources.

Image Resource Quality Score

The search system 108 generates image resource quality scores for each of the identified images 204. The image resource quality score for an image is generated from at least one of the quality scores of the resources that include the image. In some implementations, the image resource quality score for an image is the highest quality score of the resources that include the image. In another implementation, an average of multiple quality scores may be used to generate the image resource quality score. In some implementations, quality scores for a subset of the resources that include the image may be used to generate an image resource quality score, such as the resources with the top 5 or 10 quality scores.

For example, an image resource quality score for a particular image of George Washington may be the quality score of the highest ranking resource that includes that particular image. In another example, a particular image of George Washington may be found on 20 different web pages. The search system may obtain the quality scores for the 20 different web pages and calculate an average of the 20 quality scores. This average may be used as the image resource quality score for the particular image of George Washington.

Image Score

The image resource quality scores are used, in part, to determine an image score for each image. In particular, the search system 108 identifies, for each identified image 204, a set of similar images. For each image, each similar image has a measure of similarity to the image that meets a similarity measure threshold. In some implementations, such as the example data flow 200, an image similarity system 210 generates similarity measures 212 for the identified images 204. In another implementation, the search system 108 may generate the image similarity measures. The set of similar images identified for each image may be subset of the identified images, e.g., the similarity measure threshold may be used to limit the number of images identified as similar.

In some implementations, similarity measures between images may be determined by visual similarities detected using image techniques that identify various aspects of images, such as content, geometric shapes, patterns, colors, saturation, pixels, size, and/or characters, e.g., using optical character recognition (OCR). Such techniques include scale invariant feature transform (SIFT), edge detection, interest point detection, pixel matching, and other appropriate image processing techniques. The measure of similarity may be binary—e.g., similar or not similar—or may be represented by a score, such as a similarity score between 0 and 1, where 0 indicates no similarity, and 1 indicates an identical image. Any appropriate scale for a similarity score may be used to indicate the measure of similarity between images.

In other implementations, the similarity measures may be generated based on relevance measures of the image and the other images to a particular entity, label, or query. For example, at a high level, an image relevance model may be trained for a query by first selecting training images that are relevant to that query. Thereafter, an image relevance model for each query is learned. Differences between image relevance scores of images with respect to a particular query or entity may be used to determine image similarity.

In some implementations, image similarity is determined based on portions of an image that are less than the whole image. For example, a measure of similarity to an image may be based on a comparison of a portion of the image that includes a face to a portion of a similar image that includes a face. The compared portions may be specified by bounding boxes that surround faces in images. The bounding boxes may be generated, for example, by the image similarity system as part of a facial detection process.

By way of example, a collection of images of George Washington may include many images, some of which may be images of a particular portrait painting. The images may be, for example, digital reproductions of the painting, or photographs of the painting itself (taken from various angles and lighting conditions). For one of the images of the particular portrait painting, similarity measures may indicate how similar other images of the same portrait paining are to the image. Using the image similarity techniques described above and a similarity measure threshold, a set of similar images may be identified for an image. A more restrictive similarity measure threshold may require that images be identical, or near duplicates, while a less restrictive similarity measure threshold may allow more images to be considered similar.

Once similar images for an image are identified, the search system 108 generates an image score for the image. In some implementations, the image score is based on the image resource quality scores of at least one of the resources that include at least one similar image relative to image resource quality scores of the resources that include each of the identified images. An example formula for calculating an image score for an image is as follows:

$$\text{Image Score }(i, e) = \left(\sum_{j \in \text{Neighbors}(i)} IRQS(j, e)\right) \bigg/ \left(\sum_{j \in \text{Neighbors}(e)} IRQS(j, e)\right)$$

where:
Neighbors(i)=images j that are within a threshold measure of similarity to image i;
images(e)=images j identified as related to entity e; and
IRQS(j,e)=image resource quality score of image j with respect to entity e.

The image score represents a measure of authority for a particular image with respect to an entity. For example, using the formula above, an image's image score will increase as its number of similar images increases, and the image score will increase as the image resource quality scores of its similar images increase. Conversely, the image's image score will decrease as its number of similar images decreases, and the image score will decrease as the image resource quality scores of its similar images increase. Thus, a particular image that has many similar images with many high image resource quality scores is likely to have a relatively high image score as compared to an image that has relatively few similar images with low image resource quality scores.

By way of example using the above formula, an image score may be obtained for each identified image of George Washington. Assume 1000 images of George Washington were identified by the search system as related to George Washington. An image score for a particular image of the 1000 images may be calculated by taking a first sum of all image resource quality scores of images identified as similar to the particular image, and dividing that first sum by a second sum of all image resource quality scores for the 1000 images. The formula provided above is an example formula, and other suitable formulas may be used to generate an image score for an image.

In some implementations, the number of similar images may be used to generate an image score for an image. For example, assume again that there are 1000 images of George Washington identified by the search system. If a first image has 100 images that are similar to the first image, the image score for the first image may be 100. If a second image has 20 images that were identified as similar to the second image, the image score for the second image may be 20. In some implementations, the image score is based on the number of similar images relative to the total number of images identified as related to the particular person. For example, the image score for an image of a particular person may be the number of its similar images divided by the total number of images identified for the particular person. Using the previous example, the first image would have an image score of 0.1 (100/1000), while the second image would have an image score of 0.02 (20/1000).

In the example environment 200, each example image score is generated based on the image resource quality scores of images that are similar to the example images. For example, a first image score, IS1, is generated for Image1 based on a set of images 214 that are within a threshold degree of similarity to Image1. A second image score, IS2, is generated for Image2 based on a set of images 216 that are within a threshold degree of similarity to Image2; and a third image score, IS3, is generated for Image3 based on a set of images 218 that are within a threshold degree of similarity to Image3.

Additional Factors for the Image Score

In some implementations, the image score for an image is further based on a facial recognition confidence score that indicates a confidence that the image includes a face. The facial recognition confidence score may be produced by any suitable facial recognition process, such as the facial feature detection process described above. For example, the image score may be multiplied by the facial recognition confidence score.

In some implementations, the image score for an image is further based on a portrait score. For example, the image score may be multiplied by the portrait score. The portrait score indicates, for example, how closely features of a particular image match selected portrait features. In particular, the portrait score indicates a degree to which a bounding box that defines an area including a face included in an image matches selected bounding box feature values. For example, selected bounding box feature values may specify a selected size and selected position of a face with respect to the dimensions of an image. An example formula for determining a portrait score for an image is as follows:

Portrait score $(i)=1-((NWM/SIW)+(NHM/SIH))/2$ where:
SIW (Selected Image Width)=the width of image i if the aspect ratio of image i is greater than a selected image aspect ratio, or a product of the height of image i and the selected image aspect ratio if the aspect ratio of image i is less than the selected image aspect ratio;
SIH (Selected Image Height)=the quotient of the width of image i divided by the selected image aspect ratio if the aspect ratio of image i is greater than a selected image aspect ratio, or a height of image i if the aspect ratio of image i is less than the selected image aspect ratio;

NWM (Needed Width Margin)=the amount of pixels needed to place a facial bounding box of image i within the selected image width, given a selected image width margin that defines the desired margin between each side of the facial bounding box and the sides of the image; and NHM (Needed Height Margin)=the amount of pixels needed to place a facial bounding box of image i within the selected image height, given a selected image height margin that defines the desired margin between the top and bottom of the facial bounding box and, respectively, the top and bottom of the image.

The foregoing is an example formula for determining a portrait score for an image. However, any suitable formula may be used to determine a portrait score for an image.

Image Authority Score

Based on an image's image score and its image resource quality score, the search system generates an image authority score for the image. In the example environment 200, a first image authority score, IAS1, is generated for Image1 based on the image score for Image1 (IS1) and the image resource quality score for Image1 (IRQS1). A second image authority score, IAS2, is generated for Image2 based on the image score for Image2 (IS2) and the image resource quality score for Image2 (IRQS2); and a third image authority score, IAS3, is generated for Image3 based on the image score for Image3 (IS3) and the image resource quality score for Image3 (IRQS3). Any suitable formula may be used to generate an image authority score for an image. For example, an image authority score for an image may be the product or sum of the image's image score and the image's image resource quality score.

In some implementations, the image authority scores for images are stored in an index, such as the image index 112 or a separate index for entities, and the search system 108 ranks each of the identified images 204 according to the image authority scores. The rankings may be used to determine which image or images should be provided in a response to a request for an image related to the person 202 associated with the identified images. For example, the highest ranking image for a particular person may be selected as the most authoritative image for the particular person. The highest ranking image may then be provided to a user device that requested an image related to the particular person.

By way of example, assume that a particular portrait headshot of George Washington has the highest image authority score for images associated with George Washington. If a user device issues a search query to the search system 108 related to George Washington, the search system may provide data that causes the particular portrait headshot of George Washington to be displayed on the user device.

Example Process Flow

Figure 3:
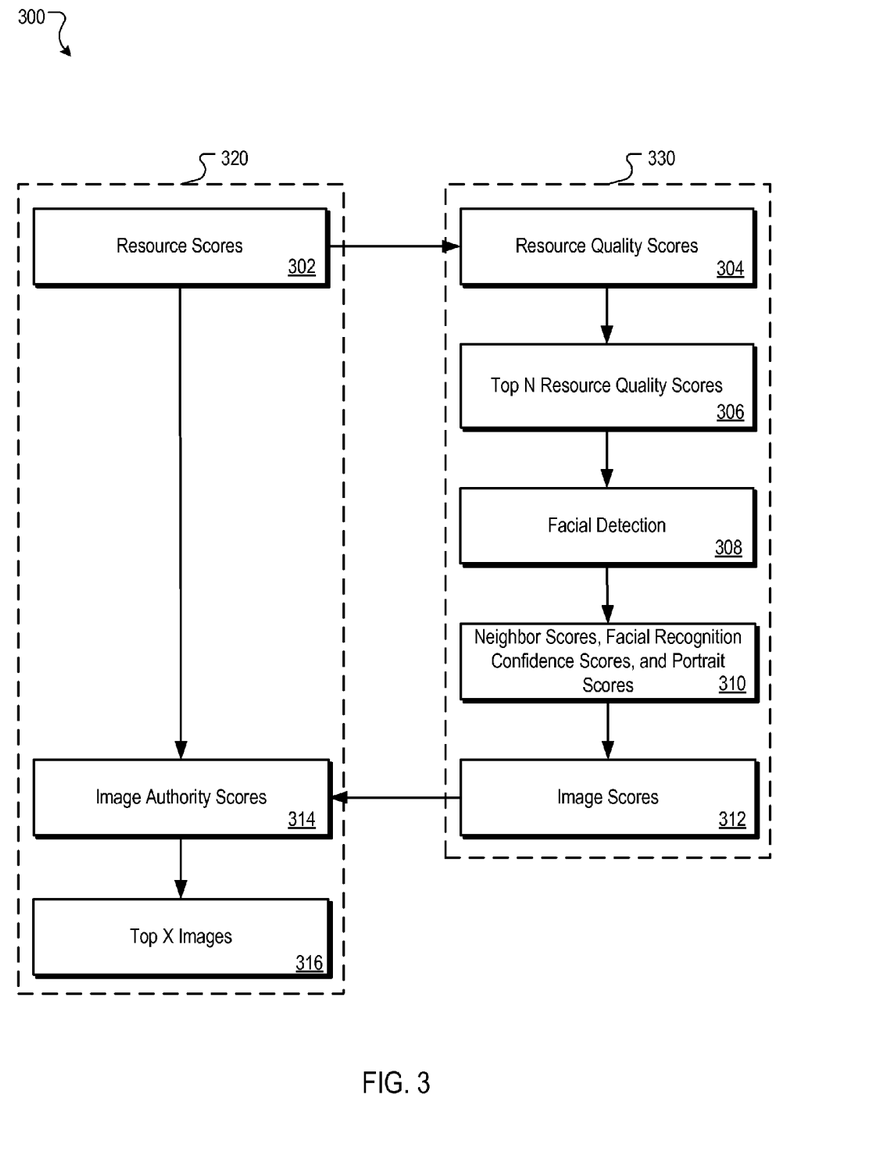
FIG. 3 is an illustration of an example data flow in which images related to entities are scored.

FIG. 3 is an illustration of an example data flow 300 in which images related to entities are scored. The example data flow 300 may take place in a search system that identifies top ranked images, such as the search system 108. In some implementations, the data flow 300 may be performed in two separate pipelines, such as a resource pipeline 320 and an image pipeline 330. Separate pipeline processing is described in more detail below.

For a given person, resource scores 302 are obtained for resources that include images related to the given person. The resource score for each resource indicates a content-dependent relevance of the resource to the given person. For example, resource scores may be obtained for resources that are determined to be relevant to a particular person. The resource score for an image may take into account, for example, the quality of the web page that includes the image or the web site that hosts the image and quality of the content on the web page—such as the quality of the text, images, videos, or advertisements on the web page.

From the resource scores 302, resource quality scores 304 are obtained. The resource quality scores are content independent measures of resource quality. For example, the resource quality score for a web page that includes an image may depend on a query-independent measure of web page quality or the quality of the web site that hosts the web page.

From the resource quality scores 304, the top N resource quality scores are selected. For example, if a search system has 1 million resource quality scores, the top 1,000 may be selected for further processing.

The example search system performs facial detection 308 on the images included in the resources with the top N resource quality scores 306. Any suitable facial recognition process may be used. After facial detection 308 is performed, neighbor scores, facial recognition confidence scores, and portrait scores are generated for each image included in a resource with one of the top N resource quality scores. Using the neighbor scores, facial recognition confidence scores, and portrait scores 310, the example search system generates image scores 312 for each image included in the resources with the top N resource quality scores.

Image authority scores 314 are generated for images based on the resource scores 302 and the image scores 312. In some implementations, image authority scores are based on the resource quality scores 304 and the image scores 312. For example, the search system 108 may multiple the resource score for an image by the image score for the image to obtain an image authority score.

The top X images 316 are selected based on the image authority scores 314. For example, the search system 108 may select the top 10 images from the 1,000 images for which image scores were obtained. In some implementations, the top X images may be stored in a data store, such as the image index 112 or a separate entity or person index.

As noted above, the data flow 300 may be implemented in two separate pipelines, a resource pipeline 320 and an image pipeline 330. In some implementations, each pipeline may be run synchronously. For example, if run synchronously, the resource pipeline 320 will wait for the image pipeline 330 to finish before generating image authority scores 314. In another implementation, each pipeline may be run asynchronously. For example, the resource pipeline may generate image authority scores 314 using previous image scores. Whether the example data flow is performed synchronously or asynchronously may depend, for example, on available resource and/or the frequency with which an example search system updates the various scores obtained in the example data flow 300.

Figure 4:
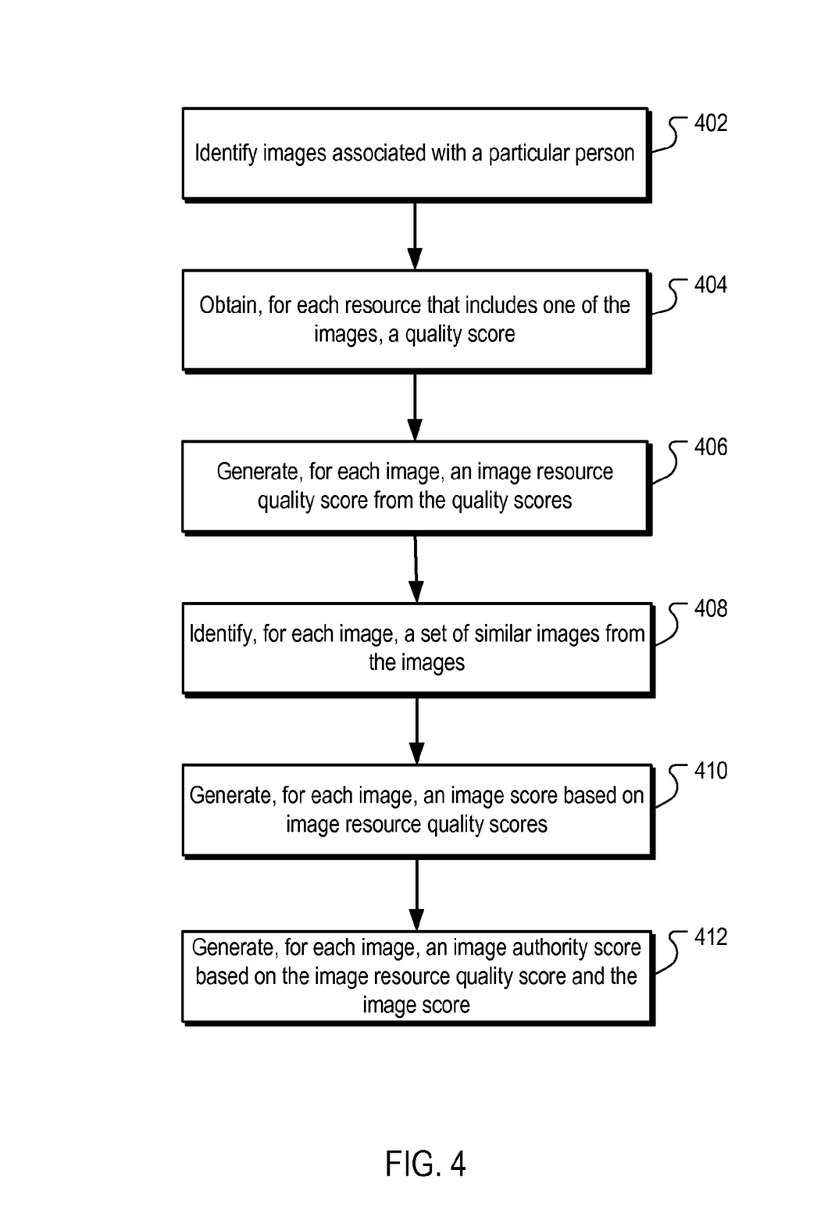
FIG. 4 is a flow diagram of an example process in which images related to entities are scored.

FIG. 4 is a flow diagram of an example process 400 in which images related to entities are scored. The process 400 may be implemented by a data processing apparatus, such as the search system 108.

The process 400 identifies images associated with a particular person (402). Each identified image is included in one or more resources.

The process 400 obtains, for each resource that includes one of the images, a quality score for the resource (404). Each quality score represents a quality of the resource with respect to the quality of other resources.

The process 400 generates, for each image, an image resource quality score from the quality scores of the resources that include the image (406). In some implementations, the image resource quality score for an image may be the highest quality score of the resources that include the image. In another implementation, the image resource quality score for an image may be an average of the top N quality scores of the resources that include the image.

The process 400 identifies, for each image, a set of similar images from the images (408). Each similar image has a measure of similarity to the image that meets a similarity threshold. Any suitable image similarity process may be used to identify sets of similar images, and in some implementations, only the portion of an image that includes a face is used to identify sets of similar images.

The process 400 generates, for each image, an image score based on image resource quality scores (410). The image score is based on image resource quality scores of one or more of the resources that include similar images relative to image resource quality scores of the resources that include each of the plurality of images. In some implementations, the image score is based on a facial recognition confidence score that indicates a confidence that the image includes a face. In some implementations, the image score is based on a portrait score that indicates the degree to which a bounding box that defines an area including a face included in an image matches certain bounding box feature values.

The process 400 generates, for each image, an image authority score based on the image resource quality score and the image score (412). For example, the image authority score for an image may be a sum of the image's image resource quality score and image score. In some implementations, the image authority score may be based on a product of the image's image resource quality score and image score.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
    identifying a plurality of images associated with a particular person, each image being included in one or more resources;
    obtaining, for each of a plurality of resources that each include one of the plurality of images, a quality score for the resource, the quality score representing a quality of the resource with respect to the quality of other resources, the quality score for each resource determined independent of the content of the resource;
    for each of the plurality of images:
        generating an image resource quality score from one or more of the quality scores of one or more of the resources that include the image;
        identifying a set of similar images from the plurality of images, each similar image having a measure of similarity to the image that meets a similarity measure threshold;
        generating an image score based on the image resource quality scores determined from the resources that include the similar images in proportion to image resource quality scores determined from the resources that include each of the plurality of images; and
        generating an image authority score based on the image resource quality score and the image score.

2. The method of claim 1, further comprising:
    ranking each of the plurality of images according to the image authority scores;
    selecting a highest ranking image from the ranked images; and
    providing a user device with data that causes the highest ranking image to be displayed.

3. The method of claim 1, wherein the image resource quality score for each image is an average of the quality scores of each resource that includes the image.

4. The method of claim 1, wherein the image resource quality score for each image is a highest quality score of the quality scores of each resource that includes the image.

5. The method of claim 1, wherein the set of similar images is a proper subset of the plurality of images.

6. The method of claim 1, wherein each of the plurality of images includes a face detected by one or more facial recognition processes.

7. The method of claim 6, wherein each measure of similarity to the image is based on a comparison of a portion of the image that includes a face to a portion of the similar image that includes a face, and wherein the portion of the image is less than the whole image and the portion of the similar image is less than the whole similar image.

8. The method of claim 6, wherein the image score for the image is further based on a facial recognition confidence score, the facial recognition confidence score indicating a confidence that the image includes one or more facial features.

9. The method of claim 6, wherein the image score for the image is further based on a portrait score, the portrait score indicating a degree to which a bounding box that defines an area including the face included in the image matches selected bounding box feature values.

10. A system comprising:
a data processing apparatus; and
a data store storing instructions that, when executed by the data processing apparatus, cause the data processing apparatus to perform operations comprising:
identifying a plurality of images associated with a particular person, each image being included in one or more resources;
obtaining, for each of a plurality of resources that each include one of the plurality of images, a quality score for the resource, the quality score representing a quality of the resource with respect to the quality of other resources, the quality score for each resource determined independent of the content of the resource;
for each of the plurality of images:
generating an image resource quality score from one or more of the quality scores of one or more of the resources that include the image;
identifying a set of similar images from the plurality of images, each similar image having a measure of similarity to the image that meets a similarity measure threshold;
generating an image score based on the image resource quality scores determined from the resources that include the similar images in proportion to image resource quality scores determined from the resources that include each of the plurality of images; and
generating an image authority score based on the image resource quality score and the image score.

11. The system of claim 10, wherein each of the plurality of images includes a face detected by one or more facial recognition processes.

12. The system of claim 11, wherein each measure of similarity to the image is based on a comparison of a portion of the image that includes a face to a portion of the similar image that includes a face, and wherein the portion of the image is less than the whole image and the portion of the similar image is less than the whole similar image.

13. The system of claim 11, wherein the image score for the image is further based on a facial recognition confidence score, the facial recognition confidence score indicating a confidence that the image includes one or more facial features.

14. The system of claim 11, wherein the image score for the image is further based on a portrait score, the portrait score indicating a degree to which a bounding box that defines an area including the face included in the image matches selected bounding box feature values.

15. A non-transitory computer readable medium comprising instructions that, when executed by a data processing apparatus, cause the data processing apparatus to perform operations comprising:
identifying a plurality of images associated with a particular person, each image being included in one or more resources;
obtaining, for each of a plurality of resources that each include one of the plurality of images, a quality score for the resource, the quality score representing a quality of the resource with respect to the quality of other resources, the quality score for each resource determined independent of the content of the resource;
for each of the plurality of images:
generating an image resource quality score from one or more of the quality scores of one or more of the resources that include the image;
identifying a set of similar images from the plurality of images, each similar image having a measure of similarity to the image that meets a similarity measure threshold;
generating an image score based on the image resource quality scores determined from the resources that include the similar images in proportion to relative to image resource quality scores determined from the resources that include each of the plurality of images; and
generating an image authority score based on the image resource quality score and the image score.

16. The non-transitory computer readable medium of claim 15,
wherein each of the plurality of images includes a face detected by one or more facial recognition processes.

17. The non-transitory computer readable medium of claim 16, wherein each measure of similarity to the image is based on a comparison of a portion of the image that includes a face to a portion of the similar image that includes a face, and wherein the portion of the image is less than the whole image and the portion of the similar image is less than the whole similar image.

18. The non-transitory computer readable medium of claim 17, wherein the image score for the image is further based on a facial recognition confidence score, the facial recognition confidence score indicating a confidence that the image includes one or more facial features.

19. The non-transitory computer readable medium of claim 18, wherein the image score for the image is further based on a portrait score, the portrait score indicating a degree to which a bounding box that defines an area including the face included in the image matches selected bounding box feature values.

* * * * *